May 5, 1925.　　　　　　　　　　　　　　　　　　1,536,212
J. K. GUNN ET AL
WEIGHING SCALE
Filed June 6, 1923　　　　4 Sheets-Sheet 1
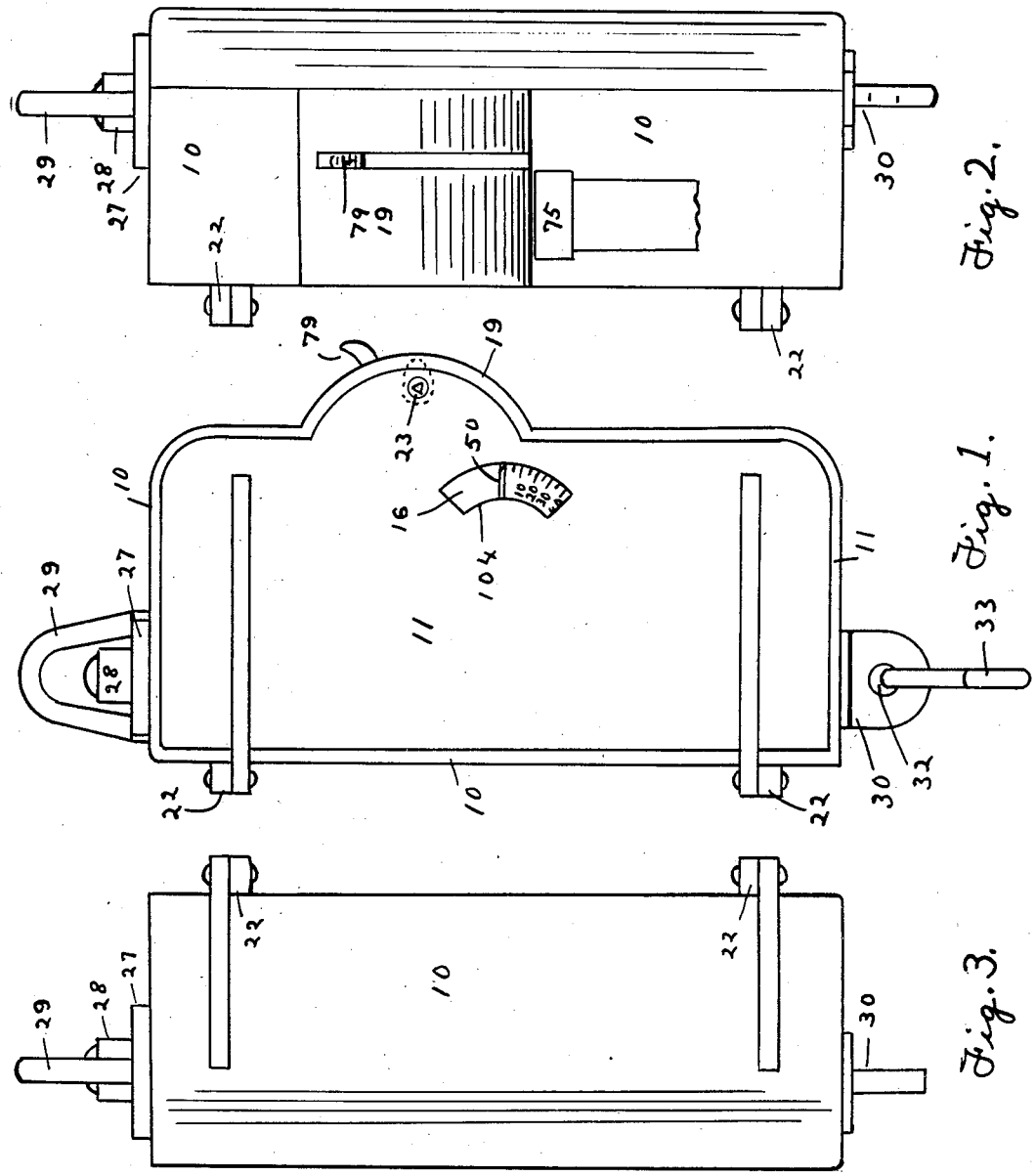
Inventors
John K. Gunn
Charles A. Schmidt
By Martin & Rendell
Attorneys May 5, 1925. 1,536,212
J. K. GUNN ET AL
WEIGHING SCALE
Filed June 6, 1923 4 Sheets-Sheet 4

Inventors
John K. Gunn
Charles A. Schmidt
By Martin & Rendell
Attorneys

Patented May 5, 1925.

1,536,212

UNITED STATES PATENT OFFICE.

JOHN K. GUNN AND CHARLES A. SCHMIDT, OF UTICA, NEW YORK.

WEIGHING SCALE.

Application filed June 6, 1923. Serial No. 643,673.

*To all whom it may concern:*

Be it known that we, JOHN K. GUNN and CHARLES A. SCHMIDT, citizens of the United States, and residents of Utica, in the county of Oneida and State of New York, have invented certain new and useful Improvements in Weighing Scales; and we do hereby declare that the following is a full, clear, and exact description thereof, which will enable others skilled in the art to which it appertains to make and use the same, reference being had to the accompanying drawings, and to the reference numerals marked thereon, which form part of this specification.

Our present invention relates to weighing scales and more particularly to automatic and recording scales.

The purpose of our invention is to provide a weighing and in the full combination also a recording scale of new and improved construction and of a construction that is extremely reliable and accurate in use.

A further purpose is to provide a device of the character described having a new and improved construction or combination of parts between the moving weighing member such as the extensible helical spring and the revoluble wheel bearing the indicating and recording characters, arranged and combined so as to transmit the movement from the movable weighing member to the indicating wheel freely and with a minimum amount of friction and in such manner that accidental lateral displacement of the spring will not affect the accuracy nor ease of operation of the scale.

Further objects of our invention are to provide new and improved means in the indicating and recording mechanism of the scale and particularly to provide means for making a duplicate record of each weighing operation one of which records will be given out from the machine as a ticket or receipt and the other of which will be retained within the casing of the machine.

Fig. 1 is a front elevation of an automatic recording scale embodying our invention.

Fig. 2 is a side elevation of the device as seen from the right of Fig. 1 and Fig. 3 is a side elevation of the device as seen from the left of Fig. 1.

Figure 6:
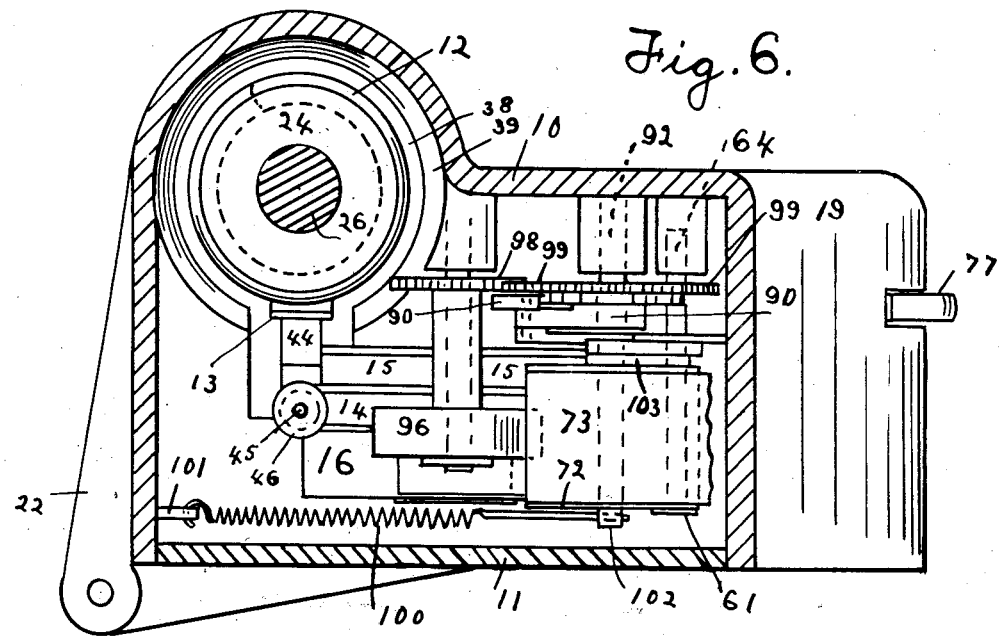
Figure 7:
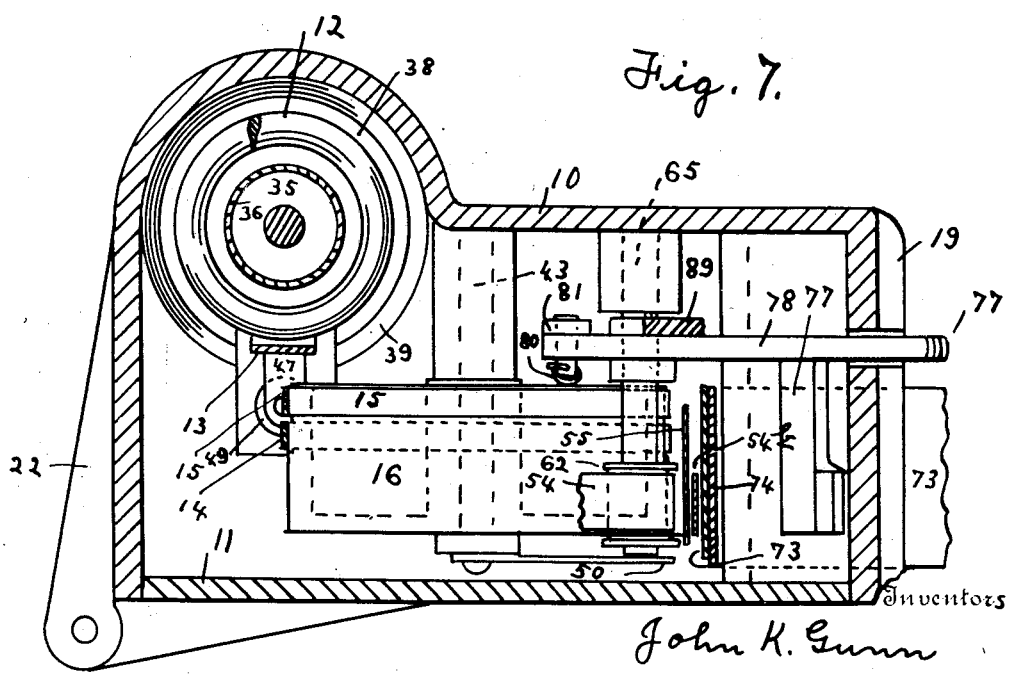

Figs. 6 and 7 are horizontal cross sectional views on lines 6—6 and 7—7 respectively showing parts on said lines and immediately below but omitting some remote parts for the sake of clearness.

Referring to the drawings in a more particular description it will be seen that the device comprises a casing 10 with door 11 to close its open front, a helical weighing spring 12, a guide bar 13 attached to the movable end of the spring and traveling therewith and flexible inelastic bands 14 and 15 connecting said bar to the wheel 16 bearing the indicating characters and mechanism for obtaining from the proper character a printed record of each weighing operation.

The casing 10 consists of a back, opposite sides and a top and bottom forming a casing preferably open for its entire front with said open front normally closed when the device is in use with the door 11 which may be conveniently hinged on integral projecting lugs 22 provided upon the casing. Since one purpose of the device is to procure a record of all sales made which record shall not be accessible to the workman using the scale but only to a proper inspector or record-taker the device will be provided with a lock as 23.

The helical weighing spring 12 has its upper end securely fastened to the top of the casing by said upper end of the spring being mounted upon an upper block 24 which at its lower portion is provided with a spiral groove 25 onto which is threaded the upper end of the helical spring. The upper portion 26 of said block 24 is of reduced diameter and extends through an aperture in the top of the casing and receives above the casing top an apertured plate 27 held in place by a nut 28 threaded onto the top end of the reduced portion of the said block 24. From the plate 27 there extends upwardly a loop or eye 29 whereby the device as a whole may be suspended in desired position.

To the lower and movable end of the spring 12 there is secured a lower block 30 as by the upper end of said block being provided with the screw-threaded or spiral groove 31 allowing said block to be screwed into the bottom end of said spring. The lower end of block 30 even in the contracted position of the spring projects below the bottom of the casing and is there provided with an eye 32 to receive the upper end of a hook 33 from which will be supported the object to be weighed or the container or carrier of said object such as ice tongs, basket, pail, platform or the like.

In order to relieve the helical spring and also the rest of the connected mechanism from undue temporary strain when the load to be weighed is first applied we prefer to provide said scale with a dash pot device. This may consist of a rod 34 extending up from the lower block 30 through an aperture in the bottom 35 of a cylinder 36 which is suspended from the upper block 24. The upper end of the dash pot rod 34 is provided with a head 37 slidingly fitting the interior of said cylinder 36 so that downward movement of the spring results in the air in the cylinder 36 having to be forced out through relatively small apertures in the cylinder or its head 35 and so prevent too sudden downward movement of the spring when it first receives its load.

Figure 5:
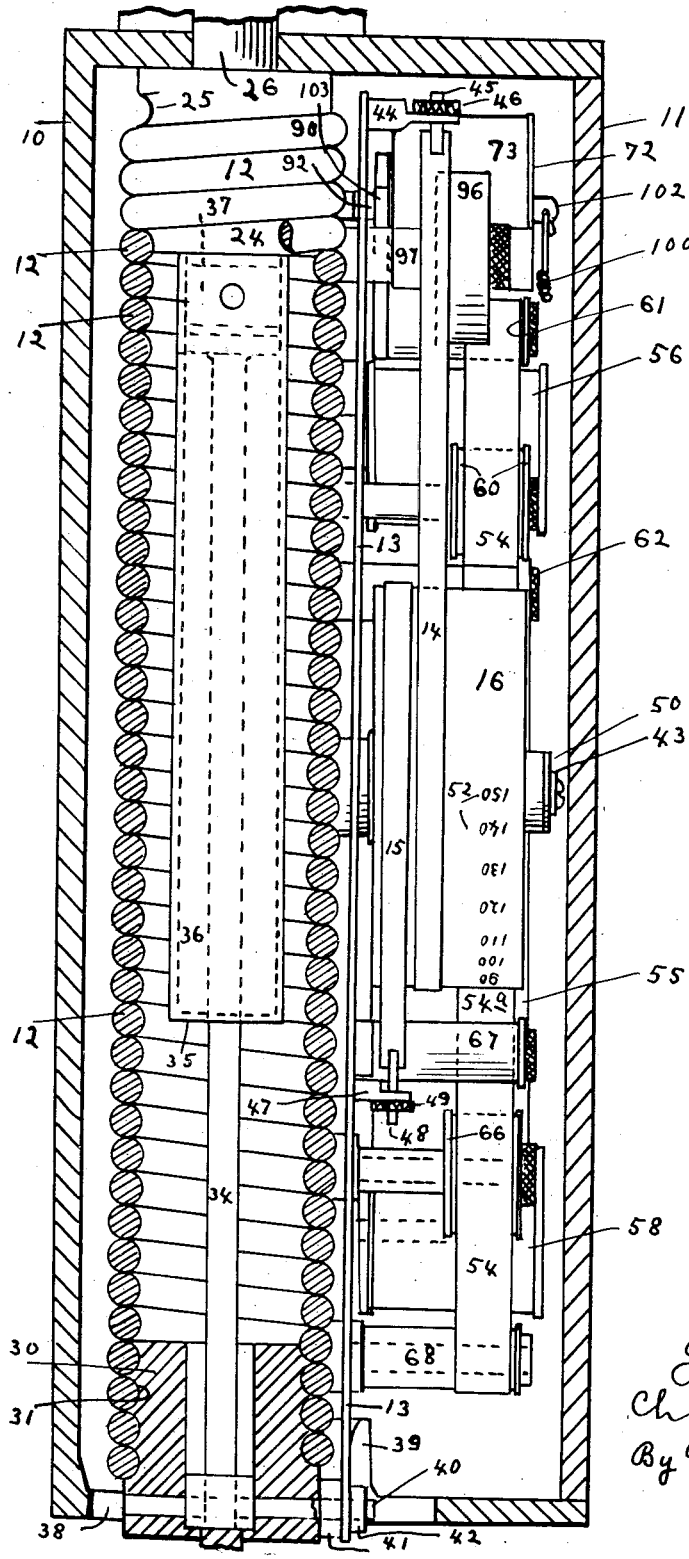
Fig. 5 is a vertical sectional view on line 5—5 of Fig. 4 but showing the dash pot and guide bar in side elevation.

It will be understood that the bottom of the casing 10 has a round aperture 38 of slightly larger diameter than the exterior diameter of the helical spring and that the lower block 30 projects downwardly therethrough when the spring is in contracted position and that as the spring is extended in use said spring will freely pass down through said aperture 38. Preferably around the edge of said aperture where it does not coincide with the rearwardly curved wall of the back of the casing there will be an upstanding flange 39 having its inner surface tapering inwardly as it extends downwardly as shown particularly in Fig. 5 in order to form a guide for the spring and prevent said spring from catching upon the casing even if the spring should be considerably deflected to one side or the other. From the round aperture 38 at its forward side the bottom of the casing and the front part of the flange 39 is cut away so as to afford clearance for the guide rod 13, the lower band 15 and their immediate connections.

Figure 4:
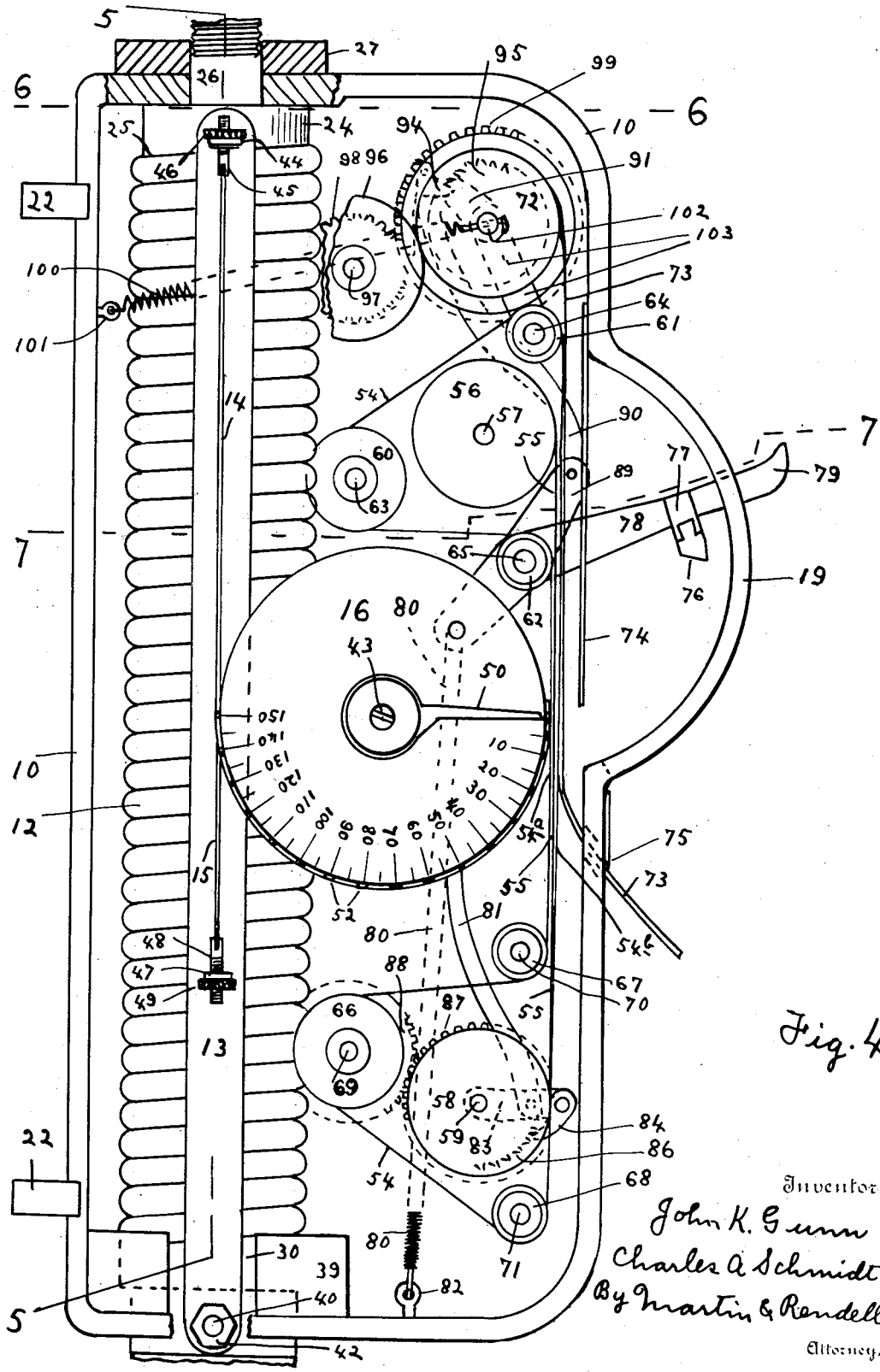
Fig. 4 is a front view of the device on an enlarged scale with the door removed from the casing.

From the forward side of the large portion of the lower block 30 there projects a strong screw-threaded pin 40. Upon this pin is mounted the apertured lower end of the guide bar 13 with a thick washer 41 between the block 30 and said guide bar in order to space said guide bar slightly out from the outer side of the helical spring 12. A nut 42 screw-threaded onto said pin 40 fastens the said guide bar rigidly to said block 30 and therewith to the lower and movable end of the spring 12 with said guide bar extending up substantially the length of said spring and parallel thereto and throughout its whole length slightly spaced therefrom. The character and type bearing wheel 16 is loosely mounted upon a stub shaft 43 suitably mounted in the back of the casing and extending forwardly therefrom in a horizontal direction with said stub shaft so located and with the wheel 16 of such diameter that its periphery at the left hand side as the parts are seen in Fig. 4 is directly in front of the center line or axis of the spring 12 and also directly in front and slightly spaced forwardly from the guide bar 13 as will appear particularly from an inspection of Figs. 4 and 5.

Upon the upper end of the guide bar 13 is provided a forwardly extending bracket 44 having near its forward end a hole through which downwardly extends a short screw-threaded rod 45 to the lower end of which is securely fastened the upper end of the upper inelastic and flexible band 14. A knurled nut 46 engages the screw-threaded rod 45 above the bracket 44 for the purpose of suitably adjusting said band 14. From the bracket 44 said band extends downwardly in a straight line and with its edge towards the front as seen in Fig. 4 to the left hand periphery of the wheel 16 against which periphery said band rests flatwise and from which point said band extends part way, say about half way, around the periphery or outer face of said wheel and at its end is securely fastened to said wheel as by pin or screw.

To the said guide bar 13 at a point below the wheel 16 even when the spring is in contracted position there is secured a similar forwardly extending bracket 47 through which extends a similar short screw-threaded rod 48 having below the bracket a knurled nut 49 with said screw-threaded rod having attached at its upper portion the lower end of the lower flexible and inelastic band 15. This band extends upwardly with one edge to the front, to the left hand portion of the periphery of the wheel 16. From there with the band resting flat upon the periphery of said wheel said band extends about said wheel substantially for its full circumference and has that end of the band securely fixed to said wheel. It will be understood that the upper and lower bands 14 and 15 are offset relative to each other as by the upper bracket 44 projecting farther front and by having said upper band 14 come down and pass around the wheel 16 slightly forward from the lower band 15. As the scale here illustrated is constructed the indicating and record-making point of the wheel 16 will be the part of said wheel immediately to the right of the axis of said wheel. Preferably such indicating and recording point will be sharply disclosed by a pointer 50 fixedly secured to the stationary stub shaft 43 and extending out to the periphery of said wheel at its right hand side. Upon the forward flat side of the wheel 16 are provided suitably spaced lines or marks near which will be placed suitable indicating characters as illustrated on the drawing to indicate the number of pounds or other units of weight. Upon the periphery of the wheel 16 near the front of the wheel will be placed similar and similarly spaced characters preferably in the form of outwardly projecting type characters 52 adapted to form part of the means of making a record of the result of each weighing operation as will be hereinafter described.

It will be understood of course that the indicating characters and type characters 52 will be so arranged and spaced upon the wheel as to be in the correct position called for by the strength of the particular weighing spring. The characters upon the indicating dial, that is the front side of the wheel 16 as shown in the drawings proceed by multiples of ten with shorter intermediate marks representing five-pound points. Such an organization of the scale will be proper for the use of relatively heavy articles such as cakes of ice and the like. It will be obvious that the scale may be readily adapted to much finer weighing by using a weighing spring of proportionately less strength. It will now be seen that when the scale so far described is suspended and brought into use by suspending from the spring the object to be weighed the helical spring will be extended or its lower end drawn downwardly in proportion to the weight of the object being weighed and that as said spring is extended its lower end will carry therewith the guide bar 13. This extension movement of the spring and downward movement of the guide bar 13 will operate to revolve to the proper extent the indicating wheel 16 through said lower band 15 rotating said wheel in an anticlockwise direction and that during such rotation the lower band 15 will be proportionately unrolled from said wheel while the upper band 14 will be to a similar extent rolled up upon said wheel. As the wheel 16 is nicely balanced upon its shaft 43 and is mounted for very easy rotation thereon and as the bands 14 and 15 are extremely flexible and are rolled up onto and unrolled from a wheel of relatively large periphery and as said indicating and recording wheel is entirely separate at this stage of the operation from the other record-making mechanism the rotation of said wheel is effected with the use of an extremely small amount of power and with the creation of an extremely small amount of friction. For these reasons the weighing mechanism here disclosed and particularly the means for connecting the movable weighing member such as the helical spring to the indicating wheel is especially well adapted to operate with a high degree of accuracy, reliability and regularity.

Assuming that the scale is being used simply as an indicating scale or assuming that the record mechanism to be hereafter described has made its complete operation and then been entirely disengaged from the wheel 16 and then the object being weighed is removed the spring 12 will again contract and its lower end move upwardly carrying therewith the guide bar 13, such upward movement will in an obvious manner now rotate the wheel 16 in a clockwise movement through the pull communicated thereto by the upper band 14. During said upward movement of the spring the upper band 14 will be unrolled from the wheel and the lower band 15 again rolled up onto said wheel until the spring returns to its normal position and the wheel is accordingly returned to a position where the zero mark will be opposite the pointer 50.

It will be noted that during use of the scale slight or even considerable lateral movement of the weighing spring incident to swinging motion of the article being weighed or from other causes will not interfere with the operation of the scale and will not affect its accuracy nor the ease of movement of the connected parts above mentioned. This greatly desired result is accomplished through the use of the flexible bands as means for communicating motion to the indicating wheel. The bands will allow the spring considerable lateral movement without affecting the accuracy of the scale and without loosening the parts or tightening any part so as to create appreciably greater friction. Were a rack and pinion or meshing gears used lateral swinging of one part would seriously interfere with the accuracy of the machine and also increase friction in the parts which would further affect the accuracy of the device.

As the indicating wheel 16 is as it were suspended between or cradled between the two flexible bands, it may be very loosely and lightly mounted upon its stub shaft 43 so that it will respond very easily and quickly to movement of said bands.

The means for obtaining if desired a duplicate printed record of each weighing operation will now be described. An endless inked or printing ribbon 54 is twice led past the right hand or recording side of the wheel 16. At both times the ribbon is opposite the row of printing characters or type 52. One travel of the ribbon as at the space 54$^a$ is past said characters with nothing intervening therebetween except normally sufficient space to allow the wheel 16 to be rotated without engaging said ribbon. The other travel of the ribbon opposite said type characters as at the space 54$^b$ is in a line slightly spaced farther from said wheel or to the right as the parts are seen in Fig. 4. Between these spaced lengths 54ª and 54ᵇ of said ribbon extends a thin strip of paper 55. Upon this strip of paper is to be printed in closely spaced lines the record of the successive weighing operations. This record strip 55 is placed in the machine upon spool 56 mounted on the pin 57 extending forward from the back of the casing. The spool 56 is located a little above the wheel 16. After passing the printing point the strip of paper 55 passes downwardly and is wound up onto the receiving spool 58 mounted on pin 59 projecting forwardly from the back of the casing.

The printing ribbon 54 is mounted above and to the right of the wheel 16 upon three guide rollers 60, 61 and 62 arranged in a triangle about the upper paper spool 57, said guide rollers being mounted respectively upon pins 63, 64 and 65 projecting forwardly from the back of the casing. Below the wheel 16 the printing ribbon is mounted upon and spaced by means of three guide rollers 66, 67 and 68 arranged in a triangle about the lower or receiving record spool 58, said rollers being respectively mounted upon pins 69, 70 and 71.

Above the spool 57 and above the guide roller 61 is located a spool 72 upon which is wound the strip of paper 73 preferably of stronger character which is to receive the duplicate record or printing of the weight. This strip of paper is led down from the spool 72 past a thin guide 74 to the printing position and outside of or to the right of the outer length of the printing ribbon. From this position the paper passes downwardly and then in a slanting direction outwardly through a slot in the right hand side of the casing past a knife 75 against the lower or knife edge of which the projecting length of paper may be drawn to cut the projecting length of paper from the remaining piece to form a receipt or ticket to give to the customer.

The printed impression is made upon the record strip and upon the receipt strip through both said strips of paper and both lengths of the printing ribbon being sharply temporarily pressed against the projecting type 52 that is at the printing position at any given weighing operation. This pressure is exerted by a hammer 76 located on the lower side of an arm 77 projecting forward from the main operating lever 78. This operating lever preferably and conveniently will be fulcrumed on the pin 65 back of the ribbon guide roller 62. Preferably the right hand side of the casing 10 is formed with an outwardly curved portion or swell 19 to give room for the travel of said arm 77 and hammer 76. In this curved portion of the casing is provided a slot through which the outer end of said main operating lever 78 extends preferably terminating in the form of a finger hook or knob 79 for the convenient operation of the scale by the person using the same. Beyond its fulcrum pin 65 the lever 78 extends a short distance and has at said inner end attached thereto the upper end of a long tension spring 80 and the upper end of a connecting rod 81. The lower end of the tension spring 80 is attached to an eye 82 conveniently located in the bottom of the casing. This tension spring normally but yieldingly holds the inner end of the operating spring 78 down and accordingly holds the outer end of said spring and the handle hook 79 in raised position. The lower end of the connecting rod 81 is connected to a link 83 mounted on the pin or stub shaft 59 carrying the receiving spool 58 but back of said spool and thereby operates a pawl 84 which engages the teeth of ratchet wheel 86 formed as a part of or attached to the rear of said receiving spool. The pawl and ratchet wheel and connecting rod are so arranged that upon downward and printing movement of the hammer 76 and the outer end of the main operating lever 78 the connecting rod moves upward and carries the pawl by the teeth of said ratchet wheel without operating the same, but upon the return movement of said operating lever incident to the tension of the spring 80 the pawl engages one of the teeth of said ratchet wheel 86 and moves said ratchet wheel and thereby the receiving spool 58 a short distance. This movement is sufficient to move the recording strip of paper 55 enough so as to bring a new line of the paper opposite the printing point ready for the next weighing operation.

Back of the ratchet wheel 86 and operating therewith is a gear wheel 87 also mounted on the stub shaft 59 and in mesh with a gear 88 mounted on the pin 69 which carries the ribbon guide roller 66. The gear 88 and this ribbon guide roller are mounted to rotate together as by said two members being connected with a hollow shaft or sleeve. It will be seen that from this arrangement the retractive movement of the operating lever under the draw of tension spring 80 will give a partial rotation to the guide roller 66 which has a friction face and thereby produces a slight feeding movement of the endless ribbon 54.

The necessary forward feed of the feeding movement is given to the receipt strip 73 coming from spool 72 by the following means: The main operating lever 78 has formed therewith or securely fastened thereto a short arm 89 projecting upwardly and slightly to the right as seen in Fig. 4. To the upper end of this arm is pivotally connected the lower end of a connecting rod 90 the upper end of which in turn is connected to a link 91 which has its inner end mounted on the stationary stub shaft 92. Secured to the upper end of the connecting rod 90 is a pawl 94 adapted to operatively engage a ratchet wheel 95 mounted on said stub shaft 92, during the retractive movement of the operating lever but riding past the teeth of said ratchet wheel during the printing movement of said main lever 78. The feeding movement thus given to the ratchet wheel 95 moves gear wheel 99 mounted therewith on shaft 92 and said wheel 99 meshes with gear 98 and so drives the friction faced feed roller 96 mounted with wheel 98 on pin 97 to the left of spool 72.

In order that feeding motion may be given to the roll of paper upon spool 72 notwithstanding the gradual decrease in the size of the roll of paper thereon, the spool 72 is carried on a pin 102 forwardly projecting from the upper end of arm 103 pivotally mounted on pin 64 and the paper on said spool 72 is yieldingly drawn against the friction face of feed roller 96 by means of a small tension spring 100 extending from eye 101 at the left hand side of the casing to the forward end of pin 102.

For the information of the person using the scale there is a window 104 in the door 11 opposite the end of the pointer 50 so that the numerals next or near said pointer may be easily read.

We claim—

1. In a scale the combination of a casing, a movable weighting member, a guide bar arranged parallel thereto and to move therewith, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the movement of said weighing member and weight indicating characters on said wheel adjacent its periphery.

2. In a scale the combination of a casing, a movable weighing member, a guide bar arranged parallel thereto and to move therewith, a wheel revolubly mounted in said casing, flexible inelastic bands extending from the opposite ends of said bar to offset positions on the same side of said wheel at its periphery and thence part way about the periphery of said wheel in opposite directions whereby the periphery of said wheel is rotated to an extent equalling the movement of said weighing member and weight indicating characters on said wheel adjacent its periphery.

3. In a recording scale the combination of a casing, a movable weighing member, a guide bar arranged parallel thereto and to move therewith, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the movement of said weighing member, weight indicating type on the periphery of said wheel and means for printing a record from the proper type.

4. In a recording scale the combination of a casing, a movable weighing member, a guide bar arranged parallel thereto and to move therewith, a wheel revolubly mounted in said casing, flexible inelastic bands extending from the opposite ends of said bar to offset positions on the same side of said wheel at its periphery and thence part way about the periphery of said wheel in opposite directions whereby the periphery of said wheel is rotated to an extent equalling the movement of said weighing member, weight indicating type on the periphery of said wheel and means for printing a record from the proper type.

5. In a scale, the combination of a casing, a helical weighing spring having one end supported thereby, a guide bar arranged parallel to said spring and connected to its movable end and moved thereby, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the movement of the free end of said spring and weight-indicating characters on said wheel adjacent its periphery.

6. In a scale, the combination of a casing, a helical weighing spring having one end supported thereby, a guide bar arranged parallel to said spring and connected to its movable end and moved thereby, a wheel revolubly mounted in said casing, flexible inelastic bands extending from the opposite ends of said bar to offset positions on the same side of said wheel at its periphery and thence part way about the periphery of said wheel in opposite directions whereby the periphery of said wheel is rotated to an extent equalling the movement of the free end of said spring and weight-indicating characters on said wheel.

7. In a recording scale, the combination of a casing, a helical weighing spring having one end supported thereby, a guide bar arranged parallel to said spring and connected to its movable end and moved thereby, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the movement of said spring, weight-indicating type on said wheel and means for printing a record from the proper type.

8. In a recording scale, the combination of a casing, a helical weighing spring having one end supported thereby, a guide bar arranged parallel to said spring and connected to its movable end and moved thereby, a wheel revolubly mounted in said casing, flexible inelastic bands extending from the opposite ends of said bar to offset positions on the same side of said wheel at its periphery and thence part way about the periphery of said wheel in opposite directions whereby the periphery of said wheel is rotated to an extent equalling the movement of said spring, weight-indicating type on said wheel and means for printing a record from the proper type.

9. In a scale the combination of a casing, a helical weighing spring having its upper end supported thereby, a guide bar arranged parallel to said spring and connected to its lower end and moved thereby, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the extension of said spring and weight-indicating characters on said wheel.

10. In a recording scale the combination of a casing, a helical weighing spring having its upper end supported thereby, a guide bar arranged parallel to said spring and connected to its lower end and moved thereby, a wheel revolubly mounted in said casing, flexible inelastic bands extending from the opposite ends of said bar to the same side of said wheel at its periphery and thence part way about the periphery of said wheel in opposite directions whereby the periphery of said wheel is rotated to an extent equalling the extension of said spring, weight-indicating type on the periphery of said wheel and means for printing a record from the proper type.

11. In a recording scale, the combination of a weighing spring, a guide bar connected to the movable end thereof, a wheel carrying printing type upon its periphery, flexible bands connecting said guide bar and said wheel at its periphery whereby the periphery of the wheel and the type thereon are moved to an extent equalling movement of the free end of the spring, means for guiding a record strip of paper past the wheel type at the printing position, a printing ribbon opposite said strip and said type, a hammer adapted to press said strip and said ribbon towards said type, a manually operated main lever connected to said hammer, and means operated from said lever for successively feeding said record strip and said ribbon past the printing position of said type.

12. In a recording scale, the combination of a weighing spring, a guide bar connected to the movable end thereof, a wheel carrying printing type upon its periphery, flexible bands connecting said guide bar and said wheel at its periphery whereby the periphery of the wheel and the type thereon are moved to an extent equalling movement of the free end of the spring, means for guiding record strips of paper past the wheel type at the printing position, printing ribbons interposed between said strips and said type, a hammer adapted to press said strips and said ribbons towards said type, a manually operated main lever connected to said hammer, and means operated from said lever for successively feeding said record strips and said ribbons past the printing position of said type.

In witness whereof we have affixed our signatures, this 28th day of April 1923.

JOHN K. GUNN.
CHARLES A. SCHMIDT.